Figure 1:
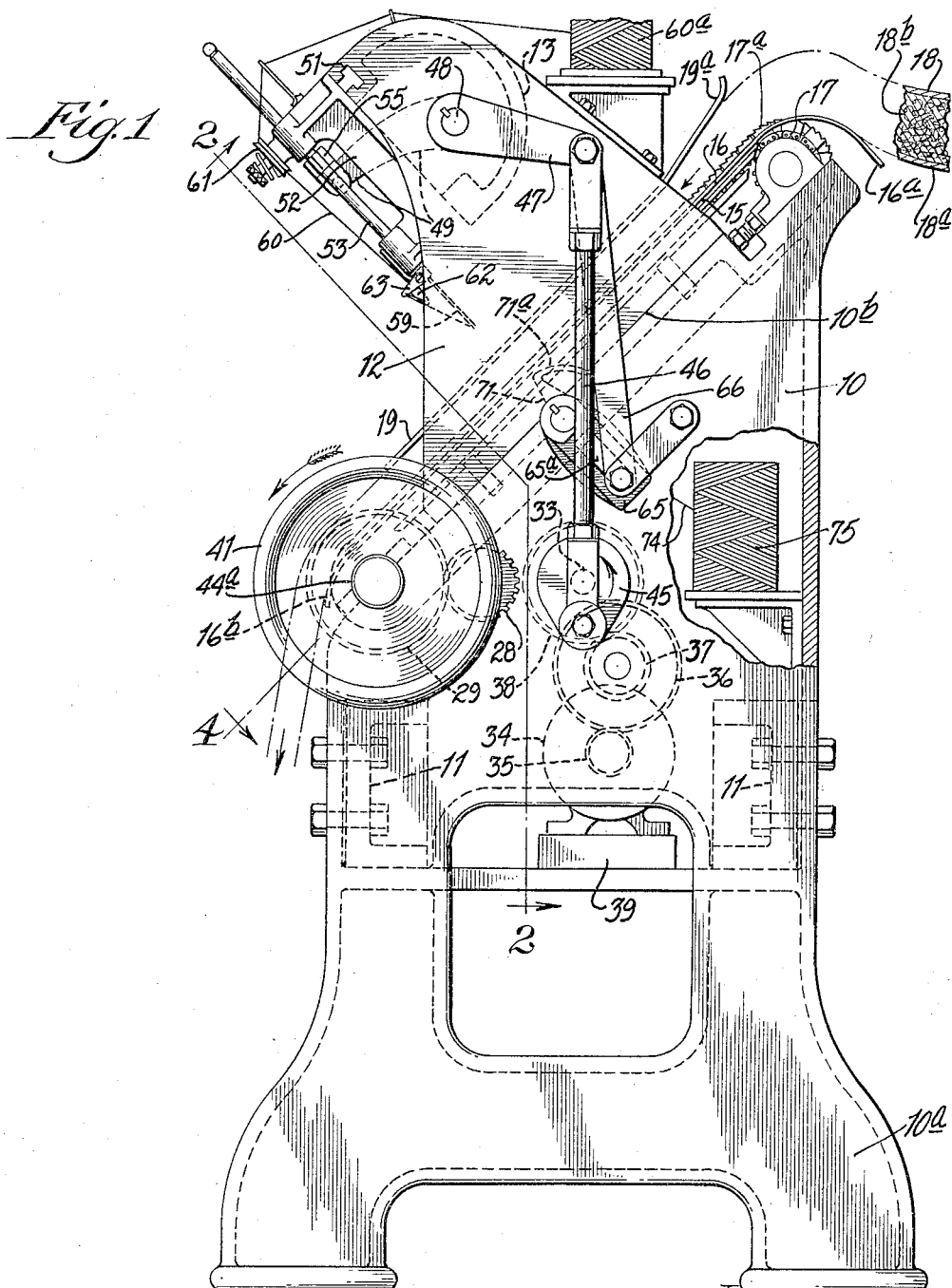

June 20, 1933.  F. W. BRINTNALL ET AL  1,915,012
PAD STITCHING OR TACKING MACHINE
Filed Sept. 6, 1928  5 Sheets-Sheet 2

Inventors:
Frank W. Brintnall
and Frederick N. Ross,
By Dymfirth Lee Chitty and Wiles
Attys.

June 20, 1933.  F. W. BRINTNALL ET AL  1,915,012
PAD STITCHING OR TACKING MACHINE
Filed Sept. 6, 1928  5 Sheets-Sheet 3

Inventors:
Frank W. Brintnall
and Frederick N. Ross,
By Lyon, Fitch, Lee, Chritton and Wiles,
Attys.

June 20, 1933.  F. W. BRINTNALL ET AL  1,915,012
PAD STITCHING OR TACKING MACHINE
Filed Sept. 6, 1928   5 Sheets-Sheet 4
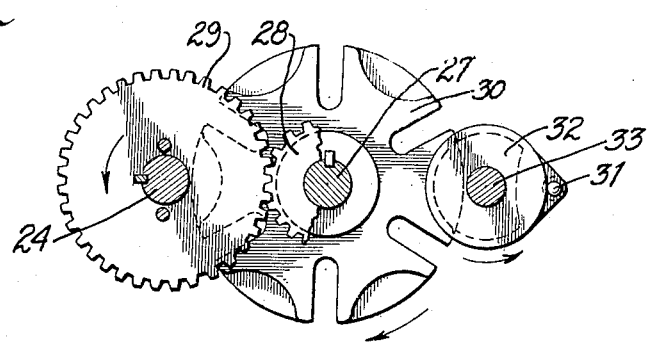
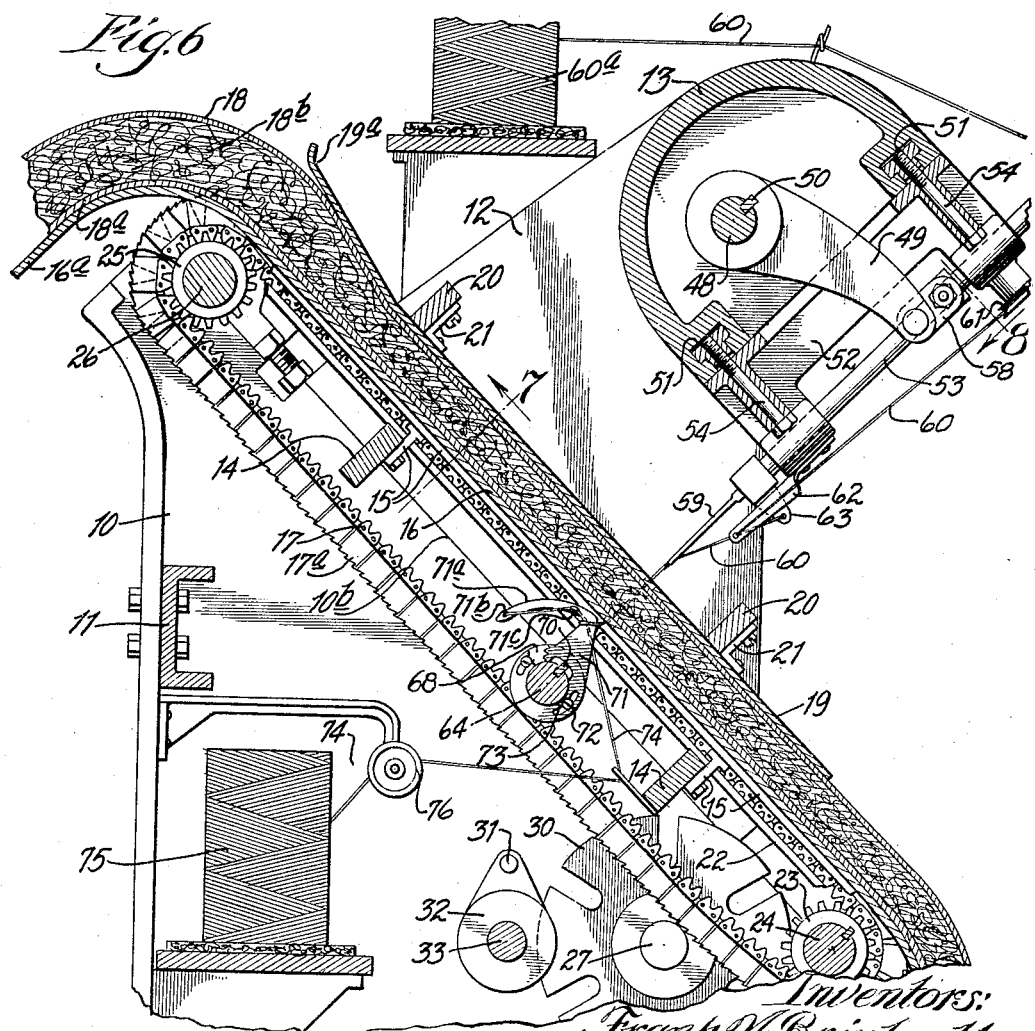

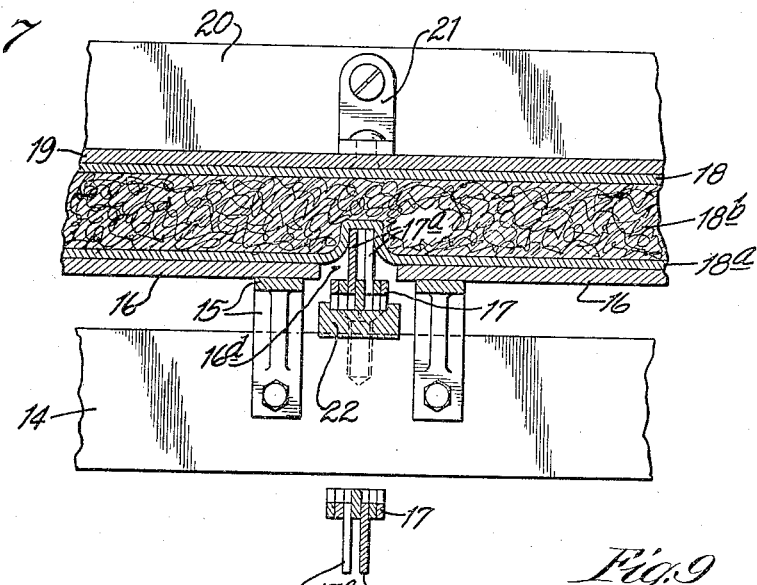
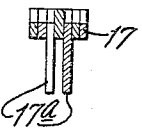
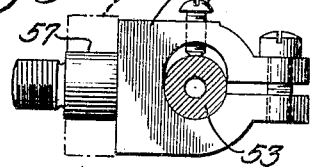
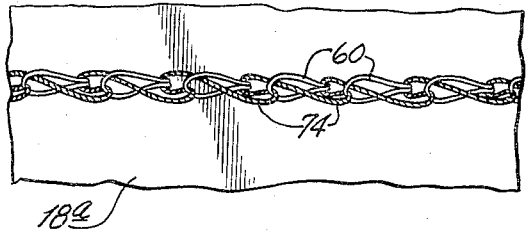
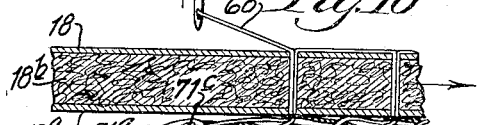
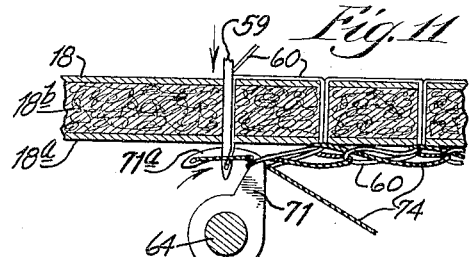
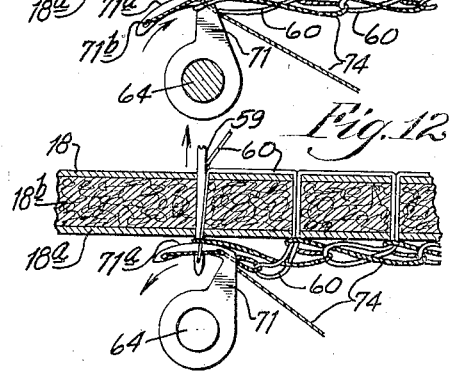
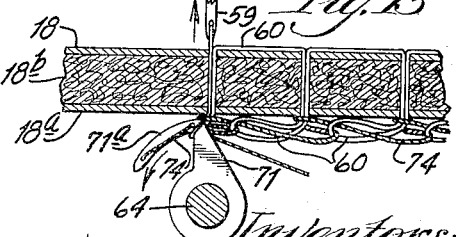

Patented June 20, 1933

1,915,012

UNITED STATES PATENT OFFICE

FRANK W. BRINTNALL AND FREDERICK N. ROSS, OF DETROIT, MICHIGAN, ASSIGNORS, BY MESNE ASSIGNMENTS, TO NATIONAL AUTOMOTIVE FIBRES, INC., OF WILMINGTON, DELAWARE, A CORPORATION OF DELAWARE

PAD-STITCHING OR TACKING MACHINE

Application filed September 6, 1928. Serial No. 304,237.

This invention relates to improvements in a pad-stitching, or tacking machine, and more especially such a machine adapted for making a series of rows of stitches in a pad. For example, the pad may consist of two sheets of burlap, or similar material, and an intervening sheet or sheets of cotton batting. Such a pad when completed may be cut into required sizes and used for various purposes, for example, upon the springs of an automobile seat. Ordinarily, the stitching or tacking is for the purpose of keeping the pads in proper condition until ready for use.

In the following specification, we have shown a machine for stitching or tacking a pad formed of cotton or similar material, placed between two sheets of fabric, such as burlap. It is obvious, however, that the upper or lower sheet of fabric may be omitted. In a pad such as shown, the cotton batting may vary in thickness, for example, from one to three inches or more.

Among the features of our invention is the provision of a machine that is fast, exact and efficient in operation.

Our improved machine is a gang-machine adapted to sew any desired number of rows of stitches simultaneously; and means are provided not only for varying the distance between the rows of stitches, but also for varying the length of the stitches.

Our improved machine is also adapted to produce stitches without the use of shuttles or bobbins. That is, the thread for both the sewing needle and the looper-needle is drawn from an extraneous source. This permits a practically unlimited supply of thread, thus doing away with the necessity of the frequent refilling of bobbins in cases where a shuttle and bobbin construction is employed. There is consequently increased efficiency and production in the use of our machines.

Our improved machine is also simple in construction and operation. The sewing-needles and actuating mechanism are readily accessible from the front; and the looper-needles and other mechanism are readily accessible from the rear. The bed of the machine is ordinarily arranged a sufficient height above the floor to bring the looper-needles about the shoulder height. Ordinarily, a machine of the character described will be adapted to sew pads six or seven feet in width; and any desired number of rows of stitches may be made. The feed will ordinarily be from one-half to two or three inches.

Means are also provided for suitably compressing the cotton padding, or other filling material, which is fed through the machine with the fabric or fabrics.

Other features and advantages of our invention will appear more fully as we proceed with our application.

Figure 2:
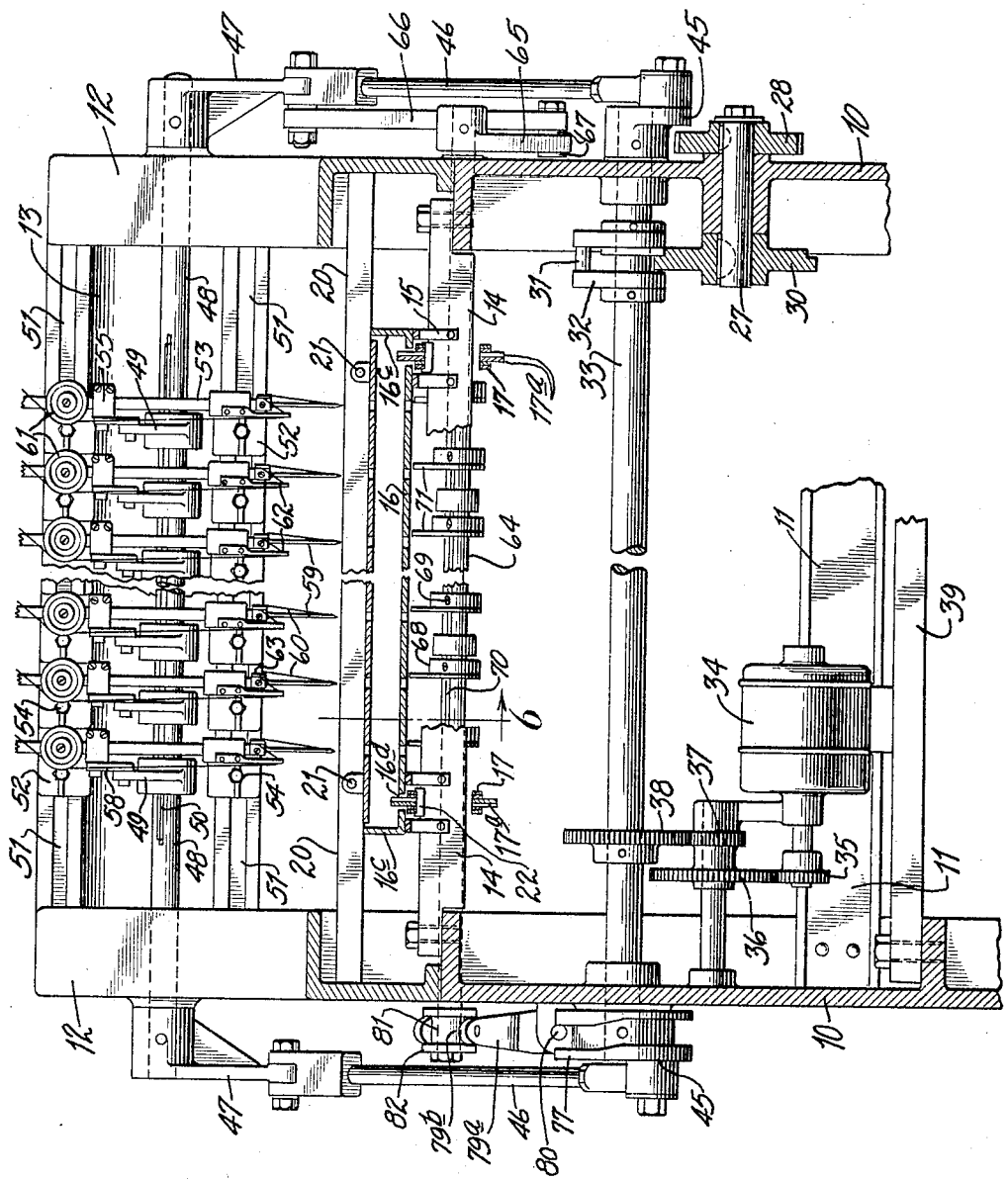
Figure 3:
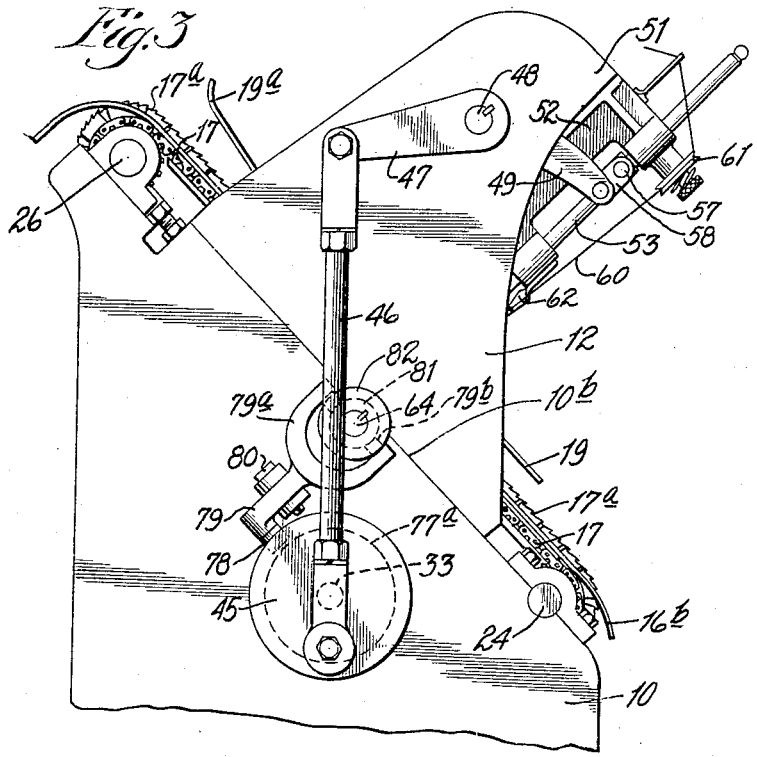
Figure 4:
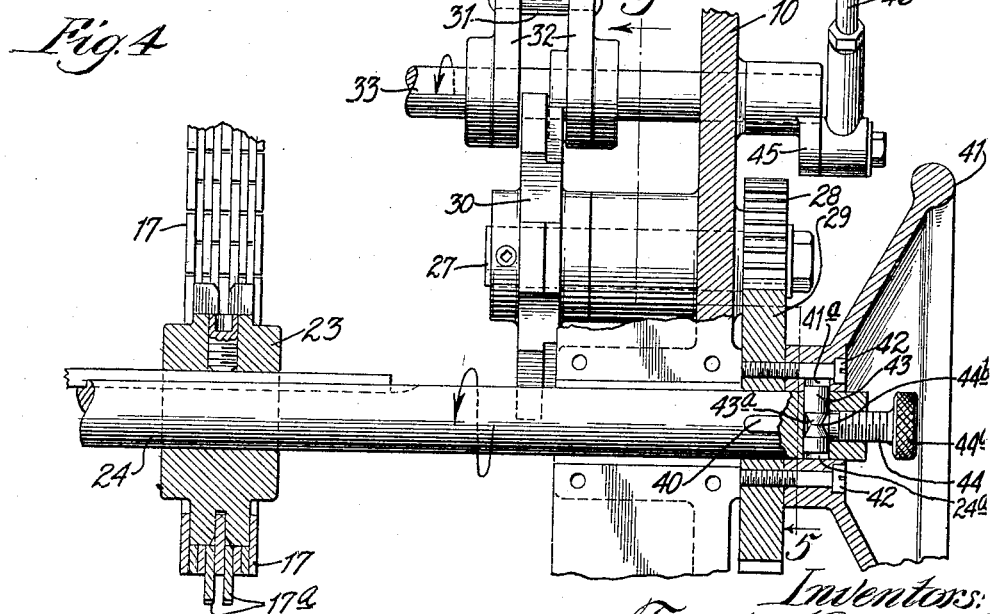

In that form of device embodying the features of our invention shown in the accompanying drawings, Fig. 1 is a view in side elevation; Fig. 2 is a view taken as indicated by the line 2 of Fig. 1; Fig. 3 is a view of the upper part of the machine in side elevation showing the opposite side from that shown in Fig. 1; Fig. 4 is a view taken as indicated by the line 4 of Fig. 1; Fig. 5 is a view taken as indicated by the line 5 of Fig. 4; Fig. 6 is a view taken as indicated by the line 6 of Fig. 2; Fig. 7 is a view taken as indicated by the line 7 of Fig. 6; Fig. 8 is a view taken as indicated by the line 8 of Fig. 6; Fig. 9 is a bottom plan view of a pad showing the completed stitch, and Figs. 10 to 13, inclusive, are vertical sectional views through the pad showing the stitching operation.

As shown in the drawings, the machine includes two suitable side members 10 provided with legs 10$^a$. The upper edges of the side members 10 are slanting, as indicated by 10$^b$. The side members 10 are joined by two suitable channels 11, 11. The top of each side member 10 carries an extension side plate 12 having its lower edge cut slanting and fastened to the upper slanting edge 10$^b$ of the side member 10. The upper ends of the plates 12 are connected by the beam 13 which is substantially semi-circular in cross-section.

Near their upper edges, the side members 10 carry two connecting supporting bars 14 which in turn are provided with brackets 15 carrying the inclined or slanting bed 16. The upper edge of the bed 16 is curved downwardly, as indicated by 16ª, and its lower edge is bent slightly downwardly, as indicated by 16ᵇ. The bed 16 is in the form of a channel member with its lateral edges turned upwardly, as indicated by 16ᶜ. This bed is also provided with a series of longitudinal slots 16ᵈ through which project the work carrying chains 17. There may be any number of chains used necessary to carry the work. For example, there may be one chain for approximately every four needles.

The chain 17 is provided with upwardly projecting toothed members 17ª adapted to project through the slots 16ᵈ to engage the work and feed it through the machine. (See Fig. 7.) As here shown, we have indicated the work as comprising the upper and lower fabrics 18 and 18ª, respectively, with the cotton batting 18ᵇ between. Hereafter, for convenience, we may indicate the work in general by the numeral 18. Above the work 18 is arranged a sheet metal compressing plate 19 supported between the side extension plates 12 by means of the cross-bars 20 and the brackets 21. The upper end of the plate 19 is bent outwardly away from the bed 16, as indicated by 19ª to permit the material 18 which is fed in from the top to enter between bed 16 and the compressing plate 19, which are spaced close enough together to give the pad the desired compression as it is fed through the machine. The pad being held downwardly by the plate 19 also permits the toothed member 17ª on the feeding chains to press up into the pad and thus engage the lower fabric 18ª to feed the material through the machine, as shown in Fig. 7.

The chains 17 are held against the work by being supported in suitable guide members 22 which are also carried by the cross-bars 14. The chains 17 are endless, and are carried on suitable driving sprockets 23 mounted on the shaft 24, the upper ends of said chains being carried on idler-sprockets 25, mounted on the shaft 26.

The shaft 24 is driven in the following manner: Adjacent this shaft is arranged an intermediate shaft 27 carrying a gear 28 meshing with the gear 29 on the shaft 24. The gears 28 and 29 are adapted to be changed in order to give any desired gear ratio in order to vary the rate of speed, thus varying the length of stitch. The shaft 27 is provided with a slotted gear or sprocket 30 constituting one member of a Geneva action, the same adapted to be driven by the pin 31 on the disc 32 carried by the drive-shaft 33. The shaft 33 may be driven in any desired manner, as, for example, by means of a motor 34 through the intermediate gears 35, 36, 37 and 38, respectively. As here shown, the motor 34 is supported on a bar 39 carried between the two side members 10. Through the Geneva action the feed chains 17 are given an intermittent movement and locked between movements.

The gear 29 is fastened onto the shaft 24 in the following manner: 40 indicates a key engaging with a keyway in the gear to prevent relative rotation between the shaft and the gear. 41 indicates a hand-wheel fastened to the gear 29 by means of screws 42. The end of the shaft 24 is provided with transverse holes 24ª in which there is slidably mounted a cylindrical key 43 having a portion of its length reduced in diameter, as indicated by 43ª. The end of the shaft 24 is provided with an axially arranged internally threaded hole in which is mounted a screw 44 with a knurled head 44ª. The inner end of the screw 44 is pointed, as indicated by 44ᵇ, and this pointed end is adapted to engage the reduced portion of the pin 43 when the screw is screwed in. The hub of the hand-wheel 41 is provided with a hole 41ª and the pin or key 43 is of such length that its end will enter this hole when the point 44ᵇ of the screw 44 is forced against the reduced portion of the pin. This will lock the hand-wheel 41 on the shaft 24. When it is desired to remove the hand-wheel 41 and gear 29, the screw 44 is loosened, thus permitting the pin 43 to move so that its end will become disengaged from the hole 41ª in the hand-wheel.

We shall now describe the needle mechanism and drive therefor. The shaft 33 is provided at its ends with a pair of cranks 45 to which are connected the connecting rods 46 having their upper ends connected to the cranks 47 on the transverse needle driving rock-shaft 48. The shaft 48 carries the needle-actuating arms 49, the key 50 preventing rotation of these arms on the shaft, but permitting transverse adjustment. The beam 13 has its edges provided with T-slots 51 to enable the attachment thereto of U-shaped guide-members 52 having slidably mounted therein the inclined needle carrying plungers 53. The members 52 are held on the beam 13 by means of the bolts 54, the nuts on the upper ends of said bolts lying in the key slots 51. This construction permits transverse adjustment of the members 52 to enable the distance between seams to be varied. Mounted on the plunger 53 is a clamp 55 held in place by a set-screw 56, said clamp having a projecting pivot 57 carrying a link 58 to the lower end of which is pivotally attached the end of the arm 49. It will be seen that rocking movement of the shaft 48 acting through the arms 49 will reciprocate the plungers 53 and thus raise and lower the needles 59 carried at their lower ends.

Thread 60 to the needles 59 is fed from the spools 60ª arranged above the machine, said thread being preferably led through a suitable tension device 61, and thence through a loop take-up device, including a stationary guide 62 carried by the U-shaped member 52 and a movable guide 63 on the lower end of the plunger 53.

64 indicates a transverse rock-shaft for carrying the looper-needles. This shaft is oscillated by means of the crank 65 connected to the upper end of the connecting rod 46 by means of the link 66. Crank 65 is provided with a slot 65ª in which is slidably mounted the square block 67 pivotally mounted on the lower end of the link 66. The shaft 64 carries a plurality of collars adapted for transverse adjustment and held in place by set-screws 69. Relative movement between the collars 68 and the shaft 64 is prevented by means of a long key 70. 71 indicates the looper-needles fastened to the collars 68 by means of the screws 72, slots 73 being provided to permit rotatable adjustment of the needles on the collars. The looper-needles 71 have their outer ends curved, as indicated by 71ª and are provided with two eyes 71ᵇ and 71ᶜ, the former being near the extreme end of the needle.

The looper or lower thread 74 is fed to the looper-needle 71 from a distant spool 75, a suitable tension device 76 being interposed between the thread supply and the looper-needle.

Means are provided for shifting the looper-actuating rock-shaft longitudinally slightly so as to bring the looper-needle first on one side of the path of the sewing-needle and then on the other side in such a manner as to enable first one of the needles and then the other to carry a loop of its thread through a loop of the other thread. This produces a stitch, as more clearly shown in Figs. 10 to 13, in which the upper or sewing-thread is shown in white, while the lower, or looper-needle is shown dark. The shifting of the shaft 64 is accomplished by providing a cam-wheel 77 on the end of the shaft 33. This cam-wheel is provided with a cam groove 77ª in which operates a cam-wheel 78 mounted on one end of the lever 79 which is pivoted at 80. The other end of the lever is forked, as indicated by 79ª, the two forked ends provided with inwardly projecting studs 79ᵇ engaging in a groove 81 in the wheel 82 on the end of the shaft 64.

It will be seen that rotation of the cam-wheel 77 causes a reciprocation of the cam roller 78, and a consequent rocking of the rock-shaft 79. This rocking will cause a reciprocation of the studs 79ᵇ and a consequent longitudinal shifting of the shaft 64. This shifting is permitted by sliding of the block 67 in the slots 65ª in the arm 65.

While we have shown and described certain embodiments of my invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible in view of the prior art.

What we claim as new, and desire to secure by Letters Patent is:

1. In a machine of the character described; a vertically disposed frame having an inclined bed constructed therein; means for feeding the work intermittently downwardly on said bed; sewing-needles arranged above the bed; looper-needles arranged below the bed; means for reciprocating the sewing-needles; and means for reciprocating the looper-needles.

2. A machine as claimed in claim 1, characterized by the provision of means at the top of the bed for compressing the work as it is fed downwardly, and means adjacent said bed below said compressing means for holding the work in compressed condition as it passes the needles.

3. A machine as claimed in claim 1, characterized by the provision of endless chains for feeding the work, with means for driving the same, said chains being provided with projecting toothed members adapted to engage the work.

4. A machine as claimed in claim 1, characterized by the provision of slots in the bed, endless chains provided with projecting toothed members extending through said slots adapted to engage the work, and means for driving said chains to feed the work.

5. A machine of the character described comprising; a frame; a slanting bed mounted on said frame and provided with slots; endless feed chains arranged below said bed and provided with toothed members projecting upwardly through the slots in said bed; means for driving said chains; a work compressing plate arranged above said bed and parallel thereto, the forward edge of said plate being slanted away from said bed; a beam transversely arranged above said bed; a plurality of needle plunger guides adjustably mounted on said beam; plungers in said guides; needles attached to said plungers; a rock-shaft transversely arranged above said bed and provided with arms having their ends pivotally connected to the needle plungers; means for rocking said rock-shaft; a looper-needle rock-shaft transversely arranged below said bed substantially under the needle plungers; looper-needles adjustably mounted on said shaft; extraneous thread supplies for the sewing-needles and looper-needles, with means for feeding the thread from said supplies to said needles; and means for rocking and reciprocating the shaft.

6. In a machine of the character described; a frame adapted to stand on a horizontal floor and equipped with an inclined bed; means for feeding the work down said inclined bed; sewing needles arranged above the bed and readily accessible from the front of the machine; and looper needles arranged below the bed and readily accessible from the back of the machine.

In witness whereof, we have hereunto set our hands, and affixed our seals this 21st day of August, 1928.

FRANK W. BRINTNALL.
FREDERICK N. ROSS.